US008962535B2

(12) United States Patent
Welton et al.

(10) Patent No.: US 8,962,535 B2
(45) Date of Patent: Feb. 24, 2015

(54) METHODS OF DIVERTING CHELATING AGENTS IN SUBTERRANEAN TREATMENTS

(75) Inventors: Thomas D. Welton, Duncan, OK (US); Bradley L. Todd, Duncan, OK (US); Larry S. Eoff, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 12/533,150

(22) Filed: Jul. 31, 2009

(65) Prior Publication Data

US 2009/0291863 A1    Nov. 26, 2009

Related U.S. Application Data

(63) Continuation-in-part of application No. 11/122,836, filed on May 5, 2005, now Pat. No. 8,278,250, which is a continuation-in-part of application No. 10/760,443, filed on Jan. 20, 2004, now Pat. No. 7,759,292, which is a continuation-in-part of application No. 10/440,337, filed on May 16, 2003, now abandoned, and a continuation-in-part of application No. 10/612,271, filed on Jul. 2, 2003, now Pat. No. 7,182,136.

(51) Int. Cl.
C09K 8/68 (2006.01)
C09K 8/86 (2006.01)
C09K 8/528 (2006.01)
C09K 8/74 (2006.01)

(52) U.S. Cl.
CPC . *C09K 8/86* (2013.01); *C09K 8/528* (2013.01); *C09K 8/74* (2013.01)
USPC ........... 507/219; 507/203; 507/241; 507/245; 507/260; 507/266; 166/306

(58) Field of Classification Search
None
See application file for complete search history.

(56) References Cited

U.S. PATENT DOCUMENTS

| | | | |
|---|---|---|---|
| 2,278,838 A | 4/1942 | Groote et al. ............. 507/261 |
| 2,670,329 A | 2/1954 | Jones ....................... 507/113 |
| 2,689,244 A | 9/1954 | Jones ......................... 536/20 |
| 2,819,278 A | 1/1958 | De Groots et al. ........ 554/51 |
| 2,843,573 A | 7/1958 | Melamed ................... 526/260 |
| 2,863,832 A | 12/1958 | Perrine ................... 252/8.55 |
| 2,877,179 A | 3/1959 | Hughes et al. ............ 507/243 |
| 2,910,436 A | 10/1959 | Fatt et al. ................ 252/8.55 |
| 3,008,898 A | 11/1961 | Hughes et al. ............ 507/243 |
| 3,052,298 A | 9/1962 | Mallot ...................... 166/290 |
| 3,065,247 A | 11/1962 | De Groots et al. ........ 554/51 |
| 3,215,199 A | 11/1965 | Dilgren ..................... 166/38 |
| 3,251,415 A | 5/1966 | Bombardieri et al. ..... 166/42 |
| 3,251,778 A | 5/1966 | Dickson et al. ........... 252/82 |
| 3,258,428 A | 6/1966 | Dickson et al. .......... 252/180 |
| 3,265,512 A | 8/1966 | Dickson et al. ........... 106/14 |
| 3,271,307 A | 9/1966 | Dickson et al. .......... 300/152 |
| 3,297,090 A | 1/1967 | Dilgren ..................... 166/38 |
| 3,307,630 A | 3/1967 | Dilgren et al. ............ 166/38 |
| 3,326,890 A | 6/1967 | Engelskirchen et al. .... 536/114 |
| 3,336,980 A | 8/1967 | Rike ......................... 166/295 |
| 3,347,789 A | 10/1967 | Dickson et al. ........... 252/8.55 |
| 3,382,924 A | 5/1968 | Veley et al. ................ 166/42 |
| 3,404,114 A | 10/1968 | Snyder et al. ............. 524/812 |
| 3,434,971 A | 3/1969 | Atkins ..................... 252/8.55 |
| 3,441,085 A | 4/1969 | Gidley ..................... 166/307 |
| 3,451,818 A | 6/1969 | Wareham ................... 96/78 |
| 3,489,222 A | 1/1970 | Millhone et al. .......... 166/290 |
| 3,601,194 A | 8/1971 | Gallus ...................... 166/283 |
| 3,647,507 A | 3/1972 | Ashcraft .................. 427/288 |
| 3,647,567 A | 3/1972 | Schweri ................... 428/463 |
| 3,689,418 A | 9/1972 | Cenci et al. |
| 3,689,468 A | 9/1972 | Warminster |
| 3,708,013 A | 1/1973 | Dismukes |
| 3,709,298 A | 1/1973 | Pramann |
| 3,744,566 A | 7/1973 | Szabo et al. |
| 3,902,557 A | 9/1975 | Shaughnessy et al. |
| 3,910,862 A | 10/1975 | Barabas et al. |
| 3,943,060 A | 3/1976 | Martin et al. |
| 3,983,941 A | 10/1976 | Fitch |
| 4,052,343 A | 10/1977 | Cunningham |
| 4,052,345 A | 10/1977 | Austin et al. |
| 4,129,183 A | 12/1978 | Kalfoglou |
| 4,129,534 A | 12/1978 | Cunningham |

(Continued)

FOREIGN PATENT DOCUMENTS

| | | | |
|---|---|---|---|
| DE | 2 250 552 | 4/1974 | |
| EP | 0 383 337 | 8/1990 | ............ E21B 33/138 |

(Continued)

OTHER PUBLICATIONS

Definition of "chelating agent" from Schlumberger Oilfield Glossary, http://www.glossary.oilfield.slb.com/default.cfm, 2002.*
Office Action for U.S. Appl. No. 10/862,132 dated Dec. 30, 2009.
Office Action for U.S. Appl. No. 11/501,595 dated Feb. 5, 2010.
Office Action for U.S. Appl. No. 11/122,836 dated Feb. 22, 2010.
Office Action for U.S. Appl. No. 11/102,062 dated Feb. 24, 2010.
Notice of Allowance for U.S. Appl. No. 10/760,443 dated Feb. 8, 2010.
Notice of Allowance for U.S. Appl. No. 10/862,132 dated Apr. 1, 2010.
Office Action for U.S. Appl. No. 10/806,894 dated Apr. 1, 2010.
Office Action for U.S. Appl. No. 11/360,215 dated Jun. 9, 2010.
Office Action for U.S. Appl. No. 11/102,062 dated Jun. 29, 2010.
Office Action for U.S. Appl. No. 11/501,595 dated Jun. 29, 2010.

(Continued)

*Primary Examiner* — John J Figueroa
(74) *Attorney, Agent, or Firm* — McDermott Will & Emery LLP; Holly Soehnge

(57) ABSTRACT

Methods and compositions including a method comprising: providing a treatment fluid comprising an aqueous fluid, a relative permeability modifier, and a chelating agent; introducing the treatment fluid into a well bore that penetrates a subterranean formation; and allowing at least a first portion of the treatment fluid to penetrate into a portion of the subterranean formation so as to substantially divert a second portion of the treatment fluid to another portion of the subterranean formation.

19 Claims, No Drawings

(56) References Cited

U.S. PATENT DOCUMENTS

| | | |
|---|---|---|
| 4,142,595 A | 3/1979 | Anderson et al. |
| 4,152,274 A * | 5/1979 | Phillips et al. ............... 507/222 |
| 4,158,521 A | 6/1979 | Anderson et al. |
| 4,158,726 A | 6/1979 | Kamada et al. |
| 4,228,277 A | 10/1980 | Landoll |
| 4,299,710 A | 11/1981 | Dupre et al. |
| 4,306,981 A | 12/1981 | Blair, Jr. |
| 4,337,828 A | 7/1982 | Blair, Jr. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,393,939 A | 7/1983 | Smith et al. |
| 4,395,340 A | 7/1983 | McLaughlin |
| 4,401,789 A | 8/1983 | Gideon |
| 4,439,334 A | 3/1984 | Borchardt |
| 4,440,649 A | 4/1984 | Loftin et al. |
| 4,441,556 A | 4/1984 | Powers et al. |
| 4,447,342 A | 5/1984 | Borchardt et al. |
| 4,460,627 A | 7/1984 | Weaver et al. |
| 4,462,718 A | 7/1984 | McLaughlin et al. |
| 4,499,214 A | 2/1985 | Sortwell |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,552,670 A | 11/1985 | Lipowski et al. |
| 4,554,081 A | 11/1985 | Borchardt et al. |
| 4,563,292 A | 1/1986 | Borchardt |
| 4,604,216 A | 8/1986 | Irvin et al. |
| 4,608,139 A | 8/1986 | Craun et al. |
| 4,619,776 A | 10/1986 | Mondshine |
| 4,625,802 A | 12/1986 | Sydansk |
| 4,627,926 A | 12/1986 | Peiffer et al. |
| 4,662,448 A | 5/1987 | Ashford et al. |
| 4,671,883 A | 6/1987 | Connell |
| 4,693,639 A | 9/1987 | Hollenbeak et al. |
| 4,699,722 A | 10/1987 | Dymond et al. |
| 4,702,319 A | 10/1987 | Bock et al. |
| 4,730,028 A | 3/1988 | Bock et al. |
| 4,814,096 A | 3/1989 | Evani |
| 4,828,725 A | 5/1989 | Lai et al. |
| 4,828,726 A | 5/1989 | Himes et al. |
| 4,856,590 A | 8/1989 | Caillier |
| 4,870,167 A | 9/1989 | Zody et al. |
| 4,941,537 A | 7/1990 | Langemeier et al. |
| 4,956,104 A | 9/1990 | Cowan et al. |
| 4,959,432 A | 9/1990 | Fan et al. |
| 4,960,876 A | 10/1990 | Molteni et al. |
| 5,051,197 A | 9/1991 | Kalfayan et al. |
| 5,071,934 A | 12/1991 | Peiffer |
| 5,097,904 A | 3/1992 | Himes |
| 5,105,886 A | 4/1992 | Strubhar et al. |
| 5,146,986 A | 9/1992 | Dalrymple |
| 5,160,642 A | 11/1992 | Schield et al. |
| 5,197,544 A | 3/1993 | Himes |
| 5,208,216 A | 5/1993 | Williamson et al. |
| 5,244,042 A | 9/1993 | Dovan et al. |
| 5,248,665 A | 9/1993 | Hale et al. |
| 5,256,651 A | 10/1993 | Phelps et al. |
| 5,271,466 A | 12/1993 | Harms |
| 5,342,530 A | 8/1994 | Aften et al. |
| 5,379,841 A | 1/1995 | Pusch et al. |
| 5,382,371 A | 1/1995 | Stahl et al. |
| 5,424,284 A | 6/1995 | Patel et al. |
| 5,445,223 A | 8/1995 | Nelson et al. |
| 5,473,059 A | 12/1995 | Yeh |
| 5,482,116 A | 1/1996 | El-Rabaa et al. |
| 5,566,760 A | 10/1996 | Harris |
| 5,597,783 A | 1/1997 | Audibert et al. |
| 5,607,902 A | 3/1997 | Smith et al. |
| 5,637,556 A | 6/1997 | Argillier et al. |
| 5,643,460 A | 7/1997 | Marble et al. |
| 5,646,093 A | 7/1997 | Dino |
| 5,669,456 A | 9/1997 | Audibert et al. |
| 5,681,796 A | 10/1997 | Nimerick |
| 5,704,426 A | 1/1998 | Rytlewski et al. |
| 5,720,347 A | 2/1998 | Audibert et al. |
| 5,728,653 A | 3/1998 | Audibert et al. |
| 5,735,349 A | 4/1998 | Dawson et al. |
| 5,755,286 A | 5/1998 | Ebinger |
| 5,887,653 A | 3/1999 | Bishop et al. |
| 5,908,814 A | 6/1999 | Patel et al. |
| 5,944,106 A | 8/1999 | Dalrymple et al. |
| 5,972,848 A | 10/1999 | Audibert et al. |
| 5,979,557 A | 11/1999 | Card et al. |
| 5,990,052 A | 11/1999 | Harris |
| 6,020,289 A | 2/2000 | Dymond |
| 6,070,664 A | 6/2000 | Dalrymple et al. |
| 6,124,245 A | 9/2000 | Patel |
| 6,187,839 B1 | 2/2001 | Eoff et al. |
| 6,194,356 B1 | 2/2001 | Jones et al. |
| 6,209,646 B1 | 4/2001 | Reddy et al. |
| 6,228,812 B1 | 5/2001 | Dawson et al. |
| 6,237,687 B1 | 5/2001 | Barbee, Jr. et al. |
| 6,242,390 B1 | 6/2001 | Mitchell et al. |
| 6,248,697 B1 | 6/2001 | Goodhue, Jr. et al. |
| 6,253,851 B1 | 7/2001 | Schroeder, Jr. et al. |
| 6,277,900 B1 | 8/2001 | Oswald et al. |
| 6,281,172 B1 | 8/2001 | Warren et al. |
| 6,283,210 B1 | 9/2001 | Soliman et al. |
| 6,291,404 B2 | 9/2001 | House |
| 6,358,889 B2 | 3/2002 | Waggenspack et al. |
| 6,359,047 B1 | 3/2002 | Thieu et al. |
| 6,364,016 B1 | 4/2002 | Dalrymple et al. |
| 6,380,137 B1 | 4/2002 | Heier et al. |
| 6,476,169 B1 | 11/2002 | Eoff et al. |
| 6,476,283 B1 | 11/2002 | Devore et al. |
| 6,497,283 B1 | 12/2002 | Eoff et al. |
| 6,516,885 B1 | 2/2003 | Munday |
| 6,562,762 B2 | 5/2003 | Cowan et al. |
| 6,569,983 B1 | 5/2003 | Treybig et al. |
| 6,601,648 B2 | 8/2003 | Ebinger |
| 6,605,570 B2 | 8/2003 | Miller et al. |
| 6,607,035 B1 | 8/2003 | Reddy et al. |
| 6,609,578 B2 | 8/2003 | Patel et al. |
| 6,626,241 B2 | 9/2003 | Nguyen |
| 6,627,719 B2 | 9/2003 | Whipple et al. |
| 6,637,517 B2 | 10/2003 | Samuel et al. |
| 6,656,885 B2 | 12/2003 | House et al. |
| 6,710,107 B2 | 3/2004 | Audibert et al. |
| 6,743,288 B2 | 6/2004 | Eoff et al. |
| 6,764,981 B1 | 7/2004 | Eoff et al. |
| 6,767,867 B2 | 7/2004 | Chatterji et al. |
| 6,767,869 B2 | 7/2004 | DiLullo et al. |
| 6,780,822 B2 | 8/2004 | Cowan et al. |
| 6,787,506 B2 | 9/2004 | Blair et al. |
| 6,790,812 B2 | 9/2004 | Halliday et al. |
| 6,803,348 B2 | 10/2004 | Jones et al. |
| 6,846,420 B2 | 1/2005 | Reddy et al. |
| 6,855,672 B2 | 2/2005 | Poelker et al. |
| 6,872,820 B2 | 3/2005 | Weber et al. |
| 6,884,760 B1 | 4/2005 | Brand et al. |
| 6,933,381 B2 | 8/2005 | Mallon et al. |
| 6,962,203 B2 | 11/2005 | Funchess |
| 6,978,836 B2 | 12/2005 | Nguyen et al. |
| 6,981,552 B2 | 1/2006 | Reddy et al. |
| 7,007,752 B2 | 3/2006 | Reddy et al. |
| 7,008,908 B2 | 3/2006 | Chan et al. |
| 7,036,587 B2 | 5/2006 | Munoz, Jr. et al. |
| 7,036,589 B2 | 5/2006 | Nguyen |
| 7,056,868 B2 | 6/2006 | Benton et al. |
| 7,081,439 B2 | 7/2006 | Sullivan et al. |
| 7,091,159 B2 | 8/2006 | Eoff et al. |
| 7,114,568 B2 | 10/2006 | Eoff et al. |
| 7,117,942 B2 | 10/2006 | Dalrymple et al. |
| 7,159,656 B2 | 1/2007 | Eoff et al. |
| 7,182,136 B2 | 2/2007 | Dalrymple et al. |
| 7,207,387 B2 | 4/2007 | Eoff et al. |
| 7,216,707 B2 | 5/2007 | Eoff et al. |
| 7,220,708 B2 | 5/2007 | Zamora et al. |
| 7,273,099 B2 | 9/2007 | East, Jr. et al. |
| 7,398,825 B2 | 7/2008 | Nguyen et al. |

(56) References Cited

U.S. PATENT DOCUMENTS

| | | | |
|---|---|---|---|
| 7,493,957 B2 | 2/2009 | Nguyen et al. | |
| 7,632,787 B2 | 12/2009 | Mirakyan et al. | |
| 7,759,292 B2 | 7/2010 | Eoff et al. | |
| 8,008,235 B2 | 8/2011 | Eoff et al. | |
| 8,091,638 B2 | 1/2012 | Dusterhoft et al. | |
| 8,592,353 B2 | 11/2013 | Dalrymple et al. | |
| 8,631,869 B2 | 1/2014 | Sierra et al. | |
| 2003/0139298 A1* | 7/2003 | Fu et al. | 507/200 |
| 2004/0209780 A1 | 10/2004 | Harris et al. | |
| 2004/0220058 A1 | 11/2004 | Eoff et al. | |
| 2004/0229756 A1* | 11/2004 | Eoff et al. | 507/219 |
| 2004/0229757 A1* | 11/2004 | Eoff et al. | 507/219 |
| 2005/0107503 A1 | 5/2005 | Couillet et al. | |
| 2005/0155796 A1 | 7/2005 | Eoff et al. | |
| 2005/0164894 A1 | 7/2005 | Eoff et al. | |
| 2005/0194140 A1 | 9/2005 | Dalrymple et al. | |
| 2005/0199396 A1 | 9/2005 | Sierra et al. | |
| 2005/0211439 A1 | 9/2005 | Willett et al. | |
| 2006/0016596 A1* | 1/2006 | Pauls et al. | 166/276 |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2006/0283592 A1 | 12/2006 | Sierra et al. | |
| 2007/0029087 A1 | 2/2007 | Nguyen et al. | |
| 2007/0114032 A1 | 5/2007 | Stegent et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0110624 A1 | 5/2008 | Nguyen et al. | |
| 2008/0139411 A1 | 6/2008 | Harris et al. | |
| 2008/0173448 A1 | 7/2008 | Nguyen et al. | |
| 2008/0196897 A1 | 8/2008 | Nguyen | |
| 2010/0276152 A1* | 11/2010 | De Wolf et al. | 166/308.2 |
| 2011/0294704 A1 | 12/2011 | Eoff et al. | |
| 2012/0048550 A1 | 3/2012 | Dusterhoft et al. | |

FOREIGN PATENT DOCUMENTS

| | | | | |
|---|---|---|---|---|
| EP | 0 896 122 | 2/1999 | | E21B 33/138 |
| EP | 1 033 378 | 9/2000 | | |
| EP | 1 193 365 | 4/2002 | | E21B 33/138 |
| EP | 1 312 753 | 5/2003 | | E21B 33/138 |
| GB | 2 128 659 A | 5/1984 | | |
| GB | 2 221 940 | 2/1990 | | C09K 7/02 |
| GB | 2 335 428 | 9/1999 | | E21B 33/138 |
| WO | WO 93/15164 | 8/1993 | | |
| WO | WO 99/49183 | 9/1999 | | E21B 43/02 |
| WO | WO 99/50530 | 10/1999 | | E21B 43/02 |
| WO | WO 00/78890 | 12/2000 | | E21B 43/25 |
| WO | WO 02/097236 | 12/2002 | | E21B 43/02 |
| WO | WO 03/056130 | 7/2003 | | E21B 43/26 |
| WO | WO 2004/022667 | 3/2004 | | C09K 7/02 |
| WO | WO 2004/094781 | 11/2004 | | E21B 43/26 |
| WO | WO 2004/101706 | 11/2004 | | E21B 43/25 |

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46$^{th}$ Annual Technical Meeting of the Petroleum Society of CIM in Banff, Alberta, Canada, May 14-17, 1995.

Halliburton, 2001 Press Releases, *Halliburton Technology Uses Revolutionary Polymer System to Control Unwanted Water Production*, 2002 Halliburton, pp. 1-2.

Halliburton, 2001 Press Releases, *First Halliburton H2Zero™ Conformance Solution Job Performed for a Producing Well in Egypt*, 2002 Halliburton, pp. 1-2.

Halliburton, 2001 Press Releases, *Halliburton Performs First H2Zero™ Conformance Solution Job in North America*, 2002 Halliburton, pp. 1-2.

BJ Services Company, *Aquacon, Product Information*, Aug. 1, 2001, pp. 1-2.

BJ Services Company, *Aquatrol I, Product Information*, Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000.

Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.

Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003.

Xu, et al., *Modeling of Laser Spallation Drilling of Rocks for Gas— and Oilwell Drilling*, SPE 95746, 2005, Society of Petroleum Engineers Inc., presented at the 2005 SPE Annual Technical Conference and Exhibition held in Dallas, Texas, Oct. 9-12, 2005.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003.

Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004.

Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005.

U.S. Appl. No. 12/080,647, filed Apr. 4, 2008.
Office Action for U.S. Appl. No. 11/122,836 dated Jul. 22, 2010.
Office Action for U.S. Appl. No. 11/485,199 dated Sep. 8, 2010.
Office Action for U.S. Appl. No. 11/360,215 dated Sep. 8, 2010.
Office Action for U.S. Appl. No. 10/806,894 dated Oct. 5, 2010.
Office Action for U.S. Appl. No. 11/102,062 dated Nov. 18, 2010.
Office Action for U.S. Appl. No. 11/122,836 dated Apr. 29, 2011.
Office Action for U.S. Appl. No. 10/806,894 dated Mar. 17, 2011.
Office Action for U.S. Appl. No. 11/102,062 dated Mar. 23, 2011.
Office Action for U.S. Appl. No. 11/485,199 dated Feb. 8, 2011.
Office Action for U.S. Appl. No. 11/360,215 dated Feb. 8, 2011.
Office Action for U.S. Appl. No. 11/501,595 dated Feb. 8, 2011.
Office Action for U.S. Appl. No. 11/501,595 dated Jun. 27, 2011.
Office Action for U.S. Appl. No. 11/360,215 dated Jul. 5, 2011.
Office Action for U.S. Appl. No. 11/102,062 dated Jun. 29, 2011.
Office Action for U.S. Appl. No. 11/485,199 dated Jul. 27, 2011.

* cited by examiner

METHODS OF DIVERTING CHELATING AGENTS IN SUBTERRANEAN TREATMENTS

CROSS-REFERENCE TO RELATED APPLICATION

This application is a continuation-in-part of U.S. application Ser. No. 11/122,836 filed on May 5, 2005 now U.S. Pat. No. 8,278,250, which is a continuation-in-part of U.S. application Ser. No. 10/760,443 filed on Jan. 20, 2004 now U.S. Pat. No. 7,759,292, which is a continuation-in-part of U.S. application Ser. No. 10/440,337 filed on May 16, 2003 now abandoned, and U.S. application Ser. No. 10/612,271 filed on Jul. 2, 2003 and issued as U.S. Pat. No. 7,182,136 on Feb. 27, 2007, which are incorporated herein by reference.

BACKGROUND

The present invention relates to subterranean treatments and, more particularly, in one or more embodiments, to introducing a relative permeability modifier into a subterranean interval ahead of, or in conjunction with, a chelating agent.

Chelating agents may be useful in a variety of subterranean operations including, but not limited to, chemical stimulation operations, damage removal operations, scale removal operations, filter cake removal operations, and acid-soluble cement removal operations. Chelating agents may be used to prevent precipitation of various compounds, which may be dissolved in the treatment fluid, by keeping ions in a soluble form until the treatment fluid can be returned to the surface. Chelating agents may also be useful for removal operations in acid sensitive formations.

When using chelating agents, it is often desired to treat an interval of a subterranean formation having sections of varying permeability. Consequently it may be difficult to obtain a uniform distribution of the chelating agent through the entire interval. For instance, the chelating agent may preferentially enter portions of a subterranean formation with high permeability at the expense of portions of the subterranean formation with lesser permeability. In some instances, these intervals with variable permeability may be water-producing intervals.

In an attempt to facilitate the uniform distribution of chelating agents throughout an entire interval, a variety of techniques have been used to divert the chelating agents to less permeable portions of a subterranean formation. Such techniques have involved, among other things, the injection of particulates, foams, or blocking polymers (e.g., crosslinked aqueous gels) into the subterranean formation so as to plug off the high-permeability portions of the subterranean formation, thereby diverting subsequently injected fluids to less permeable portions of the subterranean formation. While each of these diversion techniques has been used successfully, there may be disadvantages. In some instances, plugging off the high-permeability sections may not be suitable for a producing formation, for example, because the injected solution (or material) may reduce or stop the flow of hydrocarbons in addition to the achieving a desired diversion of the treatment fluid. Therefore, to return the formation to production, expensive and/or time-consuming remedial treatments may be required to remove the injected solution (or material). Furthermore, techniques geared toward injecting solutions (or materials) designed to plug off high-permeability portions of the subterranean formation may require expensive zonal isolation, which may be inaccurate, leading to inadvertent plugging of and/or damage to the hydrocarbon-bearing sections.

SUMMARY

The present invention relates to subterranean treatments and, more particularly, in one or more embodiments, to introducing a relative permeability modifiers into a subterranean interval ahead of, or in conjunction with a chelating agent.

In one embodiment, the present invention provides a method comprising: providing a treatment fluid comprising an aqueous fluid, a relative permeability modifier, and a chelating agent; introducing the treatment fluid into a well bore that penetrates a subterranean formation; and allowing at least a first portion of the treatment fluid to penetrate into a portion of the subterranean formation so as to substantially divert a second portion of the treatment fluid to another portion of the subterranean formation.

In another embodiment, the present invention provides a method comprising: providing a first treatment fluid comprising an aqueous fluid and a relative permeability modifier; introducing the first treatment fluid into a well bore that penetrates a subterranean formation; allowing at least a portion of the first treatment fluid to penetrate into a portion of the subterranean formation thereby reducing the permeability of the portion of the subterranean formation to aqueous liquids without substantially reducing the permeability to hydrocarbons; and introducing a second treatment fluid comprising a chelating agent into the well bore, wherein the second treatment fluid is substantially diverted from the portion of the subterranean formation to a less permeable portion of the subterranean formation.

In another embodiment, the present invention provides a method comprising: providing a treatment fluid comprising an aqueous fluid, a relative permeability modifier, and a chelating agent; introducing the treatment fluid into a well bore that penetrates a subterranean formation; allowing at least a first portion of the treatment fluid to penetrate into a portion of the subterranean formation so as to substantially divert a second portion of the treatment fluid to another portion of the subterranean formation; and allowing the chelating agent to dissolve an acid-soluble component in the subterranean formation.

Other and further features and advantages of the present invention will be readily apparent to those skilled in the art upon a reading of the description of the preferred embodiments that follows.

DESCRIPTION OF PREFERRED EMBODIMENTS

The present invention relates to subterranean treatments and, more particularly, in one or more embodiments, to introducing a relative permeability modifier into a subterranean interval ahead of, or in conjunction with, a chelating agent. As used herein, the term "relative permeability modifier" refers to a compound that is capable of reducing the permeability of a subterranean formation to aqueous fluids without substantially changing the formation's permeability to hydrocarbons. As used herein, the term "chelating agent" refers to a compound that is capable of forming a complex wherein a metal ion is bonded to two or more atoms of the chelating agent.

In certain embodiments, the methods of the present invention generally comprise providing a treatment fluid that comprises an aqueous fluid, a relative permeability modifier, and optionally a chelating agent; introducing the treatment fluid into a well bore that penetrates a subterranean formation; and allowing at least a first portion of the treatment fluid to penetrate into a portion of the subterranean formation. In some embodiments of the present invention, the relative permeability modifier and the chelating agent may be introduced into a well bore in the same treatment fluid. In other embodiments of the present invention, the relative permeability modifier and the chelating agent may be introduced into a well bore in separate treatment fluids. As used herein, the term "treatment fluid" refers generally to any fluid that may be used in a subterranean application in conjunction with a desired function and/or for a desired purpose. The term "treatment fluid" does not imply any particular action by the fluid or any component thereof. The presence of the relative permeability modifier in the portion of the subterranean formation should at least partially divert a second portion of the treatment fluid or another aqueous treatment fluid comprising a chelating agent to another portion of the subterranean formation. By way of example, the second portion of the treatment or the other aqueous treatment fluid may be diverted to a less permeable portion of the formation. The methods of the present invention may be useful in a variety of subterranean operations, such as chemical stimulation operations, damage removal operations, scale removal operations, and filter cake removal operations, where diversion may be required.

The treatment fluids of the present invention generally comprise an aqueous fluid, a relative permeability modifier, and optionally a chelating agent. A variety of additional additives suitable for use in subterranean operations also may be included in the treatment fluids as desired. The aqueous fluid of the treatment fluids of the present invention may include freshwater, saltwater, brine (e.g., saturated saltwater), or seawater. Generally, the aqueous fluid may be from any source, provided that it does not contain components that may adversely affect other components in the treatment fluid.

As described above, a relative permeability modifier may be introduced into at least a portion of a subterranean formation, in accordance with certain embodiments. In general, suitable relative permeability modifiers may be any of a variety of compounds that are capable of selectively reducing the effective permeability of a formation to water-based fluids without a comparable reduction of the formation's effective permeability to hydrocarbons. Suitable relative permeability modifiers generally include water-soluble polymers that attach to surfaces within the formation, reducing the water permeability without a comparable reduction in hydrocarbon permeability. As used in this disclosure, "water soluble" refers to at least about 0.01 weight percent soluble in distilled water at room temperature (about 72° F.). In certain embodiments, the water-soluble polymer is at least about 0.45 weight percent soluble in distilled water at room temperature. In certain embodiments, the water-soluble polymer is at least about 0.6 weight percent soluble in distilled water at room temperature.

Those of ordinary skill in the art, with the benefit of this disclosure, will appreciate that a variety of different water-soluble polymers may be suitable for use as the relative permeability modifiers. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

In addition, water-soluble polymers suitable for use as relative permeability modifiers also may include hydrophobically modified polymers. As used in this disclosure, the terms "hydrophobically modified," "hydrophobic modification," and the like refer to the incorporation into the hydrophilic polymer structure of hydrophobic groups, wherein the alkyl chain length is about 4 to about 22 carbons. While these hydrophobically modified polymers have hydrophobic groups incorporated into the hydrophilic polymer structure, they should remain water soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

Example hydrophobically modified polymers may contain a hydrophilic polymer backbone and a hydrophobic branch, wherein the hydrophobic branch includes an alkyl chain of about 4 to about 22 carbons. In certain embodiments, the hydrophobic branch may have an alkyl chain length of about 7 to about 22 carbons. In certain embodiments, the hydrophobic branch may have an alkyl chain length of about 12 to about 18 carbons. In certain embodiments, the hydrophobic branch may be a branched chain structure.

Additional examples of suitable hydrophobically modified polymers include a polymer that has been hydrophobically modified with an alkyl group present on an amino group (in the polymer backbone or as a pendant group) in quatemized form. For example, an alkyl group may be present on a dialkyl amino pendant group in quatemized form. In one embodiment, the dialkyl amino pendant group comprises a dimethyl amino pendant group. One specific example of a hydrophobically modified polymer includes a polydimethylaminoethylmethacrylate or polydimethylaminopropylmethacrylamide that has been hydrophobically modified with an alkyl group with 4 carbons to 22 carbons (e.g., 4 carbons, 6 carbons, 8 carbons, 10 carbons, 12 carbons, 14 carbons, 16 carbons, 18 carbons, 20 carbons, 22 carbons, etc.) on a dimethylamino group. An example of a suitable hydrophobically modified polymer is HPT-1υ relative permeability modifying polymer available from Halliburton Energy Services, Inc., Duncan, Okla.

Examples of suitable hydrophobically modified polymers that may be utilized include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another example of a suitable hydrophobically modified polymer comprises an amino methacrylate/alkyl amino methacrylate copolymer. An example of a suitable amino methacrylate/alkyl amino methacrylate copolymer includes a dimethylaminoethyl methacrylate/alkyl-dimethylammoniumethyl methacrylate copolymer. An example of a suitable dimethylaminoethyl methacrylate/alkyl-dimethylammoniumethyl methacrylate copolymer includes a dimethylaminoethyl methacrylate/hexadecyl-dimethylammoniumethyl methacrylate copolymer. As discussed in more detail below, these copolymers may be formed, in embodiments, by reactions with a variety of alkyl halides. For example, in some embodiments, the hydrophobically modified polymer may comprise a dimethylaminoethyl methacrylate/hexadecyl-dimethylammoniumethyl methacrylate bromide copolymer.

Example hydrophobically modified polymers may be synthesized utilizing any suitable technique. For example, the hydrophobically modified polymers may be a reaction product of a reaction comprising a hydrophilic polymer and a hydrophobic compound. By way of further example, the hydrophobically modified polymers may be prepared from a polymerization reaction comprising a hydrophilic monomer and a hydrophobically modified hydrophilic monomer. In certain embodiments, the hydrophobically modified polymers may be pre-reacted before they are placed into the well bore. Alternatively, in some embodiments, the hydrophobically modified polymers may be prepared by an appropriate in situ reaction. Suitable hydrophobically modified polymers and methods for their preparation are described in more detail in U.S. Pat. Nos. 6,476,169 and 7,117,942, the disclosures of which are incorporated herein by reference. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer via reaction with a hydrophobic compound. As described above, hydrophobic modification refers to incorporation into the hydrophilic polymer structure of hydrophobic groups, wherein the alkyl chain length is from about 4 to about 22 carbons. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and combinations thereof. Additional examples of alkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), poly(methacrylic acid/dimethylaminopropyl methacrylamide), and combinations thereof. In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments, the hydrophilic polymers comprise a polymer backbone that comprises polar heteroatoms, wherein the polar heteroatoms present within the polymer backbone of the hydrophilic polymers include oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In one embodiment, the starch is a cationic starch. A suitable cationic starch may be formed by reacting a starch, such as corn, maize, waxy maize, potato, tapioca, or the like, with the reaction product of epichlorohydrin and trialkylamine.

The hydrophobic compounds that are capable of reacting with the hydrophilic polymers include alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

A variety of hydrophobically modified hydrophilic monomers also may be used to form the hydrophobically modified polymers useful in certain embodiments. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

In addition, water-soluble polymers suitable for use as relative permeability modifiers also may include hydrophilically modified polymers. As used in this disclosure, the terms "hydrophilic modification," "hydrophilically modified," and the like refer to the incorporation into the hydrophilic polymer structure of hydrophilic groups, such as to introduce branching or to increase the degree of branching in the hydrophilic polymer. The hydrophilically modified polymers of certain embodiments typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. In certain embodiments, suitable hydrophilically modified polymers may be formed by additional hydrophilic modification, for example, to introduce branching or to increase the degree of branching, of a hydrophilic polymer. Those of ordinary skill in the art, with the benefit of this disclosure, will be able to determine other suitable methods for the preparation of suitable hydrophilically modified polymers.

The hydrophilic polymers suitable for forming the hydrophilically modified polymers used in certain embodiments should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

Hydrophilic compounds suitable for reaction with the hydrophilic polymers include, but are not limited to: polyethers that comprise halogens; sulfonates; sulfates; organic acids; and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Examples of suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of a suitable relative permeability modifier should be present in embodiments of the treatment fluids of the present invention to provide the desired degree of diversion. The amount of the relative permeability modifier to include in the treatment fluid depends on a number of factors including, the composition of the fluid to be diverted, the porosity and/or permeability of the formation, injection pressure limitations, and the like. In some embodiments, a relative permeability modifier may be present in a treatment fluid of the present invention in an amount in the range of from about 0.02% to about 10% by weight of the fluid. In some embodiments, a relative permeability modifier may be present in an amount in the range of from about 0.05% to about 1.0% by weight of the fluid. In certain embodiments of the present invention, the relative permeability modifier may be provided in a concentrated aqueous solution prior to its combination with the other components necessary to form a treatment fluid of the present invention.

The chelating agents useful in the present invention may be any suitable chelating agent that is suitable for use in subterranean operations. Examples of suitable chelating agents include ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic acid (GLDA), propylene diamine tetraacetic acid (PDTA), ethylenediaminedisuccinic acid (EDDS), diethanolglycine (DEG), ethanoldiglycine (EDG), glucoheptonate, citric acid, phosphates, amines, citrates, and salts thereof. Other suitable chelating agents may include chelating agents classified as polyphosphates, aminocarboxylic acids, aminopolycarboxylates, 1,3-diketones, hydroxycarboxylic acids, polyamines, aminoalcohols, aromatic heterocyclic bases, phenols, aminophenols, oximes, Schiff bases, tetrapyrroles, sulfur compounds, synthetic macrocyclic compounds, polymers, phosphonic acids, and mixtures and derivatives thereof. In some embodiments, the chelating agents may be present in the treatment fluids of the present invention in an amount in the range of from about 2% to about 50% by weight of the treatment fluid. In other embodiments, the chelating agent may be present in the treatment fluids of the present invention in an amount of from about 5% to about 20% by weight of the treatment fluids. In other embodiments, the chelating agent may be present in the treatment fluid of the present invention in an amount in the range of from about 10% to about 15% by weight of the treatment fluid. In some embodiments, the chelating agent may be present in the treatment fluid comprising the relative permeability modifier. In some embodiments, the chelating agent may be present in a treatment fluid introduced subsequent to the treatment fluid comprising the relative permeability modifier.

Additional additives may be included in the treatment fluids of the present invention as deemed appropriate for a particular application by one skilled in the art, with the benefit of this disclosure. Examples of such additives include, but are not limited to, acids, weighting agents, surfactants, scale inhibitors, antifoaming agents, bactericides, salts, foaming agents, fluid loss control additives, viscosifying agents, gel breakers, clay stabilizers, exchange metals, and combinations thereof. In some embodiments, exchange metals may be used to control the reaction rate of the chelating agents. For example, in some embodiments an exchange metal comprising magnesium may be used in conjunction with a chelating agent to slow the reaction rate of the chelating agent.

The treatment fluids of the present invention may be used for the diversion of chelating agents in a variety of subterranean operations, such as in chemical stimulation operations, damage removal operations, scale removal operations, and filter cake removal operations. In some embodiments, the methods comprise: providing a treatment fluid of the present invention that comprises an aqueous fluid, a relative permeability modifier, and optionally a chelating agent; introducing the treatment fluid into a well bore that penetrates a subterranean formation; and allowing at least a first portion of the treatment fluid to penetrate into a portion of the subterranean formation so that the relative permeability modifier present in the portion of the subterranean formation substantially diverts a second portion of the treatment fluid or another aqueous fluid comprising a chelating agent to another portion of the subterranean formation. It is believed that the relative permeability modifier attaches to surfaces within the porosity of the portion of the subterranean formation. Among other things, the presence of the relative permeability modifier in the portion of the subterranean formation should reduce the permeability thereof to aqueous fluids without substantially changing its permeability to hydrocarbons. Due to the reduction in the permeability of the portion of the subterranean formation, any aqueous fluid subsequently introduced into the well bore should be substantially diverted to another portion of the subterranean formation. Additionally, the relative permeability modifiers also may act to reduce subsequent problems associated with water flowing into the well bore from the subterranean formation. In some embodiments, the water-soluble, relative permeability modifier may be mixed with the aqueous fluid and introduced into a portion of the subterranean formation between stages of a treatment or as a pretreatment. In some embodiments, the treatment fluids of the present invention may be self diverting. For example, in some embodiments, the relative permeability modifier may be included in the treatment fluid comprising the chelating agent during the subterranean treatment. In these embodiments, the relative permeability modifier may progressively divert the treatment fluid to another portion of the subterranean formation. For instance, in some embodiments, as a first portion of the treatment fluid penetrates into a portion of the subterranean formation a second portion of the treatment fluid may be diverted to another portion of the subterranean formation.

In chemical stimulation operations, in some embodiments, a treatment fluid of the present invention may be introduced into the subterranean formation between stages of the chemical stimulation operation, as a pretreatment, or as a combination thereof. For example, when the chemical stimulation operation is performed in stages, in the first stage a treatment fluid comprising a chelating agent may be introduced into a portion of the subterranean formation, followed by a treatment fluid of the present invention optionally comprising a chelating agent. The relative permeability modifier present in the particular treatment fluid of the present invention should reduce the permeability of the portion of the subterranean formation to aqueous fluids. The second stage of the treatment fluid and/or a portion of the treatment fluid of the present invention then may be substantially diverted to another portion of the subterranean formation. Alternating stages of the chemical stimulation fluid and the treatment fluid of the present invention may be continued as desired. In other embodiments, the treatment fluids of the present invention may be used as a pretreatment. For instance, a treatment fluid of the present invention may be introduced in a portion of the subterranean formation, wherein the relative permeability modifier present in the treatment fluid of the present invention reduces the permeability of the portion of the subterranean formation to aqueous fluids. Any aqueous fluids introduced into the well bore after the pretreatment, such as a chemical stimulation fluid comprising a chelating agent, may be substantially diverted to another portion of the subterranean formation. In other embodiments, the chemical stimulation fluid may be self-diverting. In the self-diverting embodiments, at least a portion of the chemical stimulation fluid may be a treatment fluid of the present invention that further comprises a chelating agent. In these embodiments, the relative permeability modifier may progressively divert the treatment fluid to other portions of the subterranean formation. For instance, in some embodiments, as a first portion of the treatment fluid penetrates into a portion of the subterranean formation a second portion of the treatment fluid may be diverted to another portion of the subterranean formation.

The methods of the present invention may be used in scale removal, damage removal, and filter cake removal operations. In a these removal operations, an aqueous fluid that comprises a chelating agent may be introduced into a portion of the subterranean formation between stages of the removal operation, as a pretreatment, or as a combination thereof. For example, when the removal operation is performed in stages, in the first stage an aqueous fluid comprising a chelating agent may be introduced into a portion of the subterranean formation, followed by a treatment fluid of the present invention optionally comprising a chelating agent. The relative permeability modifier present in the particular treatment fluid of the present invention should reduce the permeability of the portion of the subterranean formation to aqueous fluids. The second stage of the aqueous fluid and/or a portion of the treatment fluid of the present invention then may be substantially diverted to another portion of the subterranean formation. Alternating stages of the aqueous fluid and the treatment fluid of the present invention may be continued as desired. In other embodiments, the treatment fluids of the present invention may be used as a pretreatment. For instance, a treatment fluid of the present invention may be introduced in a portion of the subterranean formation, wherein the relative permeability modifier present in the treatment fluid of the present invention reduces the permeability of the portion of the subterranean formation to aqueous fluids. Any aqueous fluids introduced into the well bore after the pretreatment, such as removal fluids comprising a chelating agent, may be substantially diverted to another portion of the subterranean formation. In other embodiments, the removal fluid may be self-diverting. In the self-diverting embodiments, at least a portion of the removal fluid may be a treatment fluid of the present invention that further comprises a chelating agent. In these embodiments, the relative permeability modifier may progressively divert the treatment fluid to other portions of the subterranean formation. For instance, in some embodiments, as a first portion of the treatment fluid penetrates into a portion of the subterranean formation a second portion of the treatment fluid may be diverted to another portion of the subterranean formation.

To facilitate a better understanding of the present invention, the following examples of specific embodiments are given. In no way should the following examples be read to limit, or to define, the scope of the invention.

EXAMPLE 1

A relative permeability modifier useful in the present invention was prepared by mixing 47.7 grams ("g") of deionized water, 0.38 g of (n-hexadecyl) dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis(2-amidinopropane) dihydrochloride, was added. The resulting solution was then heated, with stirring, to 110° F. and held for 18 hours to produce a highly viscous polymer solution.

EXAMPLE 2

A relative permeability modifier useful in the present invention was prepared by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis(2-amidinopropane) dihydrochloride, was added. The resulting solution was then heated, with stirring, to 110° F. and held for 18 hours to produce a highly viscous polymer solution.

EXAMPLE 3

A relative permeability modifier useful in the present invention was prepared as follows. First, a polymer was made by mixing 1,968 g of deionized water, 105 g of dimethylaminoethyl methacrylate and sparging with nitrogen for 30 minutes. Thereafter, the pH was adjusted to approximately 7.9 with sulfuric acid and a polymerization initiator, such as 00.46 g of 2,2'-azo bis(2-amidinopropane) dihydrochloride was added. The resulting solution was then heated, with stirring, to 110° F. and held for 18 hours to produce poly(dimethylaminoethyl methacrylate).

The poly(dimethylaminoethyl methacrylate) was then hydrophobically modified by adding 71.0 g of poly(dimethylaminoethyl methacrylate) to a 250 ml round flask, followed by 15% NaOH to achieve a pH of approximately 8.9. Next, 54.6 g of water, 0.36 g of C16 alkyl (n-hexadecyl) bromide, and 0.39 g of benzylcetyldimethylammonium bromide surfactant were added to quatemize the poly(dimethylaminoethyl methacrylate) homopolymer and form a dimethylaminoethyl methacrylate/hexadecyl-dimethylammoniumethyl methacrylate copolymer. This mixture was then heated, with stirring, to 140° F. and held for 24 hours to produce a highly viscous polymer solution.

EXAMPLE 4

A relative permeability modifier useful in the present invention was prepared as follows. First, a polymer was made by mixing 45.0 g of dimethylaminoethyl methacrylate, 6.8 g acrylic acid, 372.0 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis (2-amidinopropane) dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95.0 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding 5 mL of 17% hydrochloric acid, 2.0 g sodium chloride and 14.7 g water.

EXAMPLE 5

Tests were performed to illustrate how a relative permeability modifier useful in the present invention may affect the diversion of aqueous fluids in carbonate lithology. The cores used in these tests were Bedford limestone cores having dimensions of 6 inches in length by a 1-inch diameter. The water core was a Bedford limestone core at residual water saturation. The oil core was a Bedford limestone core at residual oil saturation. The tests were performed at 175° F. and a differential pressure of 22 atmospheres across the core.

The sample treatment fluid used in this example contained 2,000 ppm of a relative permeability modifier in a 2% by weight potassium chloride brine. Thus, the sample treatment fluid used comprised 2% of KCl by weight and 0.2% of a relative permeability modifier by weight. The relative permeability modifier was a dimethylaminoethyl methacrylate/hexadecyl-dimethylammoniumethyl methacrylate copolymer prepared as described in Example 3.

For the flow sequences listed in this example, the water was an API brine of 9% NaCl by weight and 1% $CaCl_2$ by weight, the acid was aqueous solution containing 0.5% HCl by weight, the oil was kerosene, and the spacer fluid was an aqueous solution containing 5% $NH_4Cl$ by weight.

The following procedure was used for this series of tests. The cores were connected such that a sample treatment fluid could enter either core using a parallel flow system. The parallel flow system may represent, for example, bullheading a treatment fluid into a well with layered water-producing and oil-producing zones. Parallel flow tests are described in "Structure and Process Optimization for Use of a Polymeric Relative-Permeability Modifier in Conformance Control," SPE 64985 presented at the 2001 SPE International Symposium on Oilfield Chemistry held in Houston, Tex., February 13-16, the relevant disclosure of which is incorporate herein by reference.

Once the cores were placed in parallel, a control test was first performed by flowing 200 ml of the acid into the parallel flow system. The acid preferentially entered the water core with 142 ml of the acid entering the water core and 58 ml of the acid entering the oil core. The results of the control test are shown in Table 1.

After the control test, the cores were placed in parallel so that the sample treatment fluid could enter either core. Subsequent to the core's placement in parallel, the parallel flow system experienced a treatment flow sequence of sample treatment fluid-spacer fluid-acid. After treatment with the sample treatment fluid, the majority of the acid was diverted from the water core to the oil core. 175 ml of the acid entered the oil core and 25 ml of the acid entered the water core. The results of the treatment are shown in Table 1.

TABLE 1

|  | Volume of Acid Entering Core (ml) |
|---|---|
| Control |  |
| Water Core | 142 |
| Oil Core | 58 |
| Treatment |  |
| Water Core | 25 |
| Oil Core | 175 |

Therefore, Example 5 indicates that a relative permeability modifier useful in the present invention may be suitable for the diversion of aqueous fluids.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    providing a treatment fluid comprising an aqueous fluid, a relative permeability modifier, and a chelating agent;
        wherein the relative permeability modifier comprises about 0.05% to about 1.0% by weight of the treatment fluid; and
        wherein the relative permeability modifier comprises an alkyl group having about 7 to about 22 carbon atoms;
    introducing the treatment fluid into a well bore that penetrates a subterranean formation, the subterranean formation having sections of varying permeability;
    allowing at least a first portion of the treatment fluid to penetrate into a first section of the subterranean formation having a higher permeability than a second section of the subterranean formation; and
    substantially diverting a second portion of the treatment fluid to the second section of the subterranean formation.

2. The method of claim 1 wherein the chelating agent comprises at least one chelating agent selected from the group consisting of: ethylenediaminetetraacetic acid, hydroxyethyl ethylenediamine triacetic acid, nitrilotriacetic acid, citric acid, a phosphate, an amine, a citrate, diethylene triamine pentaacetic acid, glutamic acid diacetic acid, propylene diamine tetraacetic acid, ethylenediaminedisuccinic acid, diethanolglycine, ethanoldiglycine, glucoheptonate, and a salt thereof.

3. The method of claim 1 wherein the chelating agent is present in the treatment fluid in an amount in the range of from about 2% to about 50% by weight of the treatment fluid.

4. The method of claim 1 wherein the relative permeability modifier comprises a hydrophobically modified polymer or a hydrophilically modified polymer.

5. The method of claim 1 wherein the relative permeability modifier comprises a reaction product of a reaction comprising a hydrophilic polymer and a hydrophobic compound or a polymerization reaction product of a polymerization reaction comprising a hydrophilic monomer and a hydrophobically modified hydrophilic monomer.

6. The method of claim 1 wherein the chelating agent comprises glutamic acid diacetic acid or a salt thereof.

7. The method of claim 1, wherein the second portion of the treatment fluid is substantially diverted to the second section of the subterranean formation during a damage removal operation, a scale removal operation, or a filter cake removal operation.

8. A method comprising:
    providing a first treatment fluid comprising an aqueous fluid and a relative permeability modifier;
        wherein the relative permeability modifier comprises about 0.05% to about 1.0% by weight of the treatment fluid; and
        wherein the relative permeability modifier comprises an alkyl group having about 7 to about 22 carbon atoms;
    introducing the first treatment fluid into a well bore that penetrates a subterranean formation, the subterranean formation having sections of variable permeability;
    allowing at least a portion of the first treatment fluid to penetrate into a first section of the subterranean formation having a higher permeability than a second section of the subterranean formation, thereby reducing the permeability of the first section of the subterranean formation to aqueous liquids without substantially reducing the permeability of the first section of the subterranean formation to hydrocarbons;

introducing a second treatment fluid comprising an aqueous fluid and a chelating agent into the well bore; and substantially diverting the second treatment fluid from the first section of the subterranean formation to the second section of the subterranean formation.

9. The method of claim 8 wherein the chelating agent comprises at least one chelating agent selected from the group consisting of: ethylenediaminetetraacetic acid, hydroxyethyl ethylenediamine triacetic acid, nitrilotriacetic acid, citric acid, a phosphate, an amine, a citrate, diethylene triamine pentaacetic acid, glutamic acid diacetic acid, propylene diamine tetraacetic acid, ethylenediaminedisuccinic acid, diethanolglycine, ethanoldiglycine, glucoheptonate, and a salt thereof.

10. The method of claim 8 wherein the chelating agent is present in the second treatment fluid in an amount in the range of from about 2% to about 50% by weight of the second treatment fluid.

11. The method of claim 8 wherein the relative permeability modifier comprises a hydrophobically modified polymer or a hydrophilically modified polymer.

12. The method of claim 11 wherein the relative permeability modifier comprises a polymer backbone comprising polar heteroatoms.

13. The method of claim 8 wherein the relative permeability modifier comprises a reaction product of a reaction comprising a hydrophilic polymer and a hydrophobic compound or a polymerization reaction product of a polymerization reaction comprising a hydrophilic monomer and a hydrophobically modified hydrophilic monomer.

14. The method of claim 8, wherein the second treatment fluid is substantially diverted to the second section of the subterranean formation during a damage removal operation, a scale removal operation, or a filter cake removal operation.

15. A method comprising:

providing a treatment fluid comprising an aqueous fluid, a relative permeability modifier, and a chelating agent;
wherein the relative permeability modifier comprises about 0.05% to about 1.0% by weight of the treatment fluid; and
wherein the relative permeability modifier comprises an alkyl group having about 7 to about 22 carbon atoms;

introducing the treatment fluid into a well bore that penetrates a subterranean formation;

allowing at least a first portion of the treatment fluid to penetrate into a first section of the subterranean formation;

substantially diverting a second portion of the treatment fluid to a second section of the subterranean formation during a damage removal operation, a scale removal operation, or a filter cake removal operation; and allowing the chelating agent to dissolve an acid-soluble component in the second section of the subterranean formation.

16. The method of claim 15 wherein the chelating agent comprises at least one chelating agent selected from the group consisting of: ethylenediaminetetraacetic acid, hydroxyethyl ethylenediamine triacetic acid, nitrilotriacetic acid, citric acid, a phosphate, an amine, a citrate, diethylene triamine pentaacetic acid, glutamic acid diacetic acid, propylene diamine tetraacetic acid, ethylenediaminedisuccinic acid, diethanolglycine, ethanoldiglycine, glucoheptonate, and a salt thereof.

17. The method of claim 15 wherein the chelating agent is present in the treatment fluid in an amount in the range of from about 2% to about 50% by weight of the treatment fluid.

18. The method of claim 15 wherein the relative permeability modifier comprises a hydrophobically modified polymer or a hydrophilically modified polymer.

19. The method of claim 17 wherein the relative permeability modifier comprises a polymer backbone comprising polar heteroatoms.

* * * * *